United States Patent [19]

Houchens, Jr. et al.

[11] Patent Number: 5,217,335
[45] Date of Patent: Jun. 8, 1993

[54] PLASTIC LENS GENERATOR AND METHOD

[75] Inventors: Lewis D. Houchens, Jr., North Garden; John M. Davis, Midlothian, both of Va.

[73] Assignee: National Optronics, Inc., Charlottesville, Va.

[21] Appl. No.: 513,628

[22] Filed: Apr. 24, 1990

[51] Int. Cl.$^5$ ............................................... B23C 3/04
[52] U.S. Cl. .................................. 409/80; 51/165.71; 51/101 LG; 409/134; 409/166
[58] Field of Search ................. 409/80, 84, 165, 166, 409/104, 122, 134; 51/101 LG, 165.71, 105 LG; 82/1.11, 118, 127

[56] References Cited

U.S. PATENT DOCUMENTS

| | | | |
|---|---|---|---|
| 2,360,001 | 10/1944 | Le Tourneau | 279/4.09 X |
| 2,600,815 | 6/1952 | Turner | 51/131 |
| 3,065,578 | 11/1962 | Royston | 51/165 |
| 3,267,617 | 8/1966 | Volk | 51/105 |
| 3,790,875 | 2/1974 | Craxton | 318/573 |
| 3,831,237 | 8/1974 | Gunsalus | 29/105 R |
| 3,866,358 | 2/1975 | Rupp | 51/33 R |
| 4,038,783 | 8/1977 | Rosenthal | 51/33 W |
| 4,251,172 | 2/1981 | Durand | 408/228 |
| 4,264,249 | 4/1981 | Dawson | 409/199 |
| 4,271,636 | 6/1981 | Howilton | 51/33 W |
| 4,493,168 | 1/1985 | Field, Jr. | 51/165.87 |
| 4,574,527 | 3/1986 | Craxton | 51/33 W |
| 4,589,231 | 5/1986 | Roberts | 51/124 L |
| 4,760,672 | 8/1988 | Darcangelo et al. | 51/284 R |
| 4,989,316 | 2/1991 | Logan et al. | 51/101 LG X |

FOREIGN PATENT DOCUMENTS

0281754  9/1988  European Pat. Off.

*Primary Examiner*—Z. R. Bilinsky
*Attorney, Agent, or Firm*—Joseph W. Berenato, III

[57] ABSTRACT

The generator for plastic lenses comprises a rotatable chuck for rotating an optical lens blank on a first axis. A drive system displaces the chuck and thereby the lens blank generally transverse to the first axis. A cutter is operably associatable with the chuck for engaging the lens blank and causing shaping thereof. The cutter includes a high speed rotary element rotatable on a second axis angularly disposed relative to the first axis. A second drive system for selectively displacing the cutter parallel to the first axis is provided. A computer control is operably associated with the first and second drive systems for coordinating displacement of the associated chuck and cutter for causing a selected curvature to be generated on the blank.

30 Claims, 6 Drawing Sheets

PLASTIC LENS GENERATOR AND METHOD

The manufacture of optical lenses, particularly prescription eyeglass lenses, requires that the surfaces be appropriately contoured to provide the desired optical properties. The outer or front surface of the lens typically is concave, and the inner surface may be concave or convex. The surfaces must be carefully manufactured with reference to each other in order to assure that the optical properties are met for the particular prescription.

Many eyeglass lenses are now manufactured from various plastic materials (80% of the U.S. market), such as acrylic and polycarbonate compositions, but they are finished using techniques earlier applied to glass. The techniques used for forming a glass blank into a suitable lens requires a large, complicated machine, and a number of steps before the finished product is achieved. For example, it is conventional to use a wheel, such as disclosed in Roberts, U.S. Pat. No. 4,589,231, to provide a rough outline of the desired contour on the blank, followed by a number of subsequent finishing steps to remove the thin grooves and subsurface damage which otherwise would mar the surface and cause elliptical error due to the physical limitations of the glass processing techniques. These subsequent steps include a number of polishing operations, each of which is intended to remove the grooves and fine out the elliptical error. These subsequent finishing steps increase the cost of the finished lens, and are very time consuming.

It is not economically feasible for an optician, wholesale eyeglass manufacturer, or lens manufacturer to stock all of the finished lenses required for each frame style and required optical property. Also, consumers are no longer willing to wait the days or weeks required to manufacture the lens for the selected frame, and are demanding faster service. At the same time, the lens manufacturer is suffering increased costs and wishes to minimize the manufacturing cost of the lens, with regard to the time required, the de-skilling of the operation, and the space involved. These competing concerns have brought about a need for a plastic lens generating device which occupies minimal space, which generates a blank into a lens in minimal time, and which produces a lens with a more accurate surface when compared to conventional techniques, requiring fewer reduced finishing steps.

OBJECTS AND SUMMARY OF THE INVENTION

A primary object of the disclosed invention is to provide a generator for plastic lenses which rapidly and accurately as compared to existing machines, forms the back surface of the lens blank into an intermediate lens requiring minimum subsequent polishing steps.

A further object of the disclosed invention is to provide a method for rapidly transforming a lens blank into a semi-finished lens having a surface that requires minimal polishing thereafter.

A plastic lens generator according to the invention comprises means for rotating an optical (prescription) lens blank on a first axis. First means displace the rotating means and thereby the lens blank generally transverse to the first axis. Cutter means are operably associatable with the rotating means for engaging the lens blank and causing shaping thereof, the cutter means including a high speed rotary cutter element rotatable on a second axis angularly disposed relative to the first axis. Second means selectively displace the cutter means parallel to the first axis. Means are operably associated with the first and second displacing means for coordinating displacement of the rotating and cutter means so that an infinitely variable back surface, depending on the positions of the three axes, is generated on the lens blank by the tangential point of the cutter.

A lens generator comprises a housing including an interior base, an opening, and a pivotal door selectively closing the opening. Means are operably associated with the base for securely holding and rotating a lens blank on a first axis, the rotating means being movable relative to the base on a second axis extending generally transverse to the first axis. First means are operably associated with the base and the rotating means for displacing the rotating means along the second axis. Cutter means are operably associated with the base for displacement along a third axis parallel to the first axis. The cutter means includes a rotatable cutter element selectively engageable with a blank being rotated by the cutter means for causing shaping thereof, and the cutter element is rotatable on a fourth axis disposed at an angle of more than 0° and less than 90° relative to the first axis. Second means are operably associated with the cutter means for causing displacement thereof. Means are operably associated with the first and second displacement means for controlling displacement thereof, and thereby of the associated rotating and cutter means so that the lens blank is selectively shaped by the cutter element.

The method of shaping a plastic lens comprises the steps of providing a lens blank having a surface to be shaped. The lens is rotated on a first axis. The surface of the lens is contacted at the first axis with a rapidly rotating cutter extending angularly relative to the first axis. The lens is controllably moved transverse to the first axis while movement of the cutter is controlled in a continuous manner parallel to the first axis so that the surface achieves a predefined shape.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE INVENTION

Figure 1:
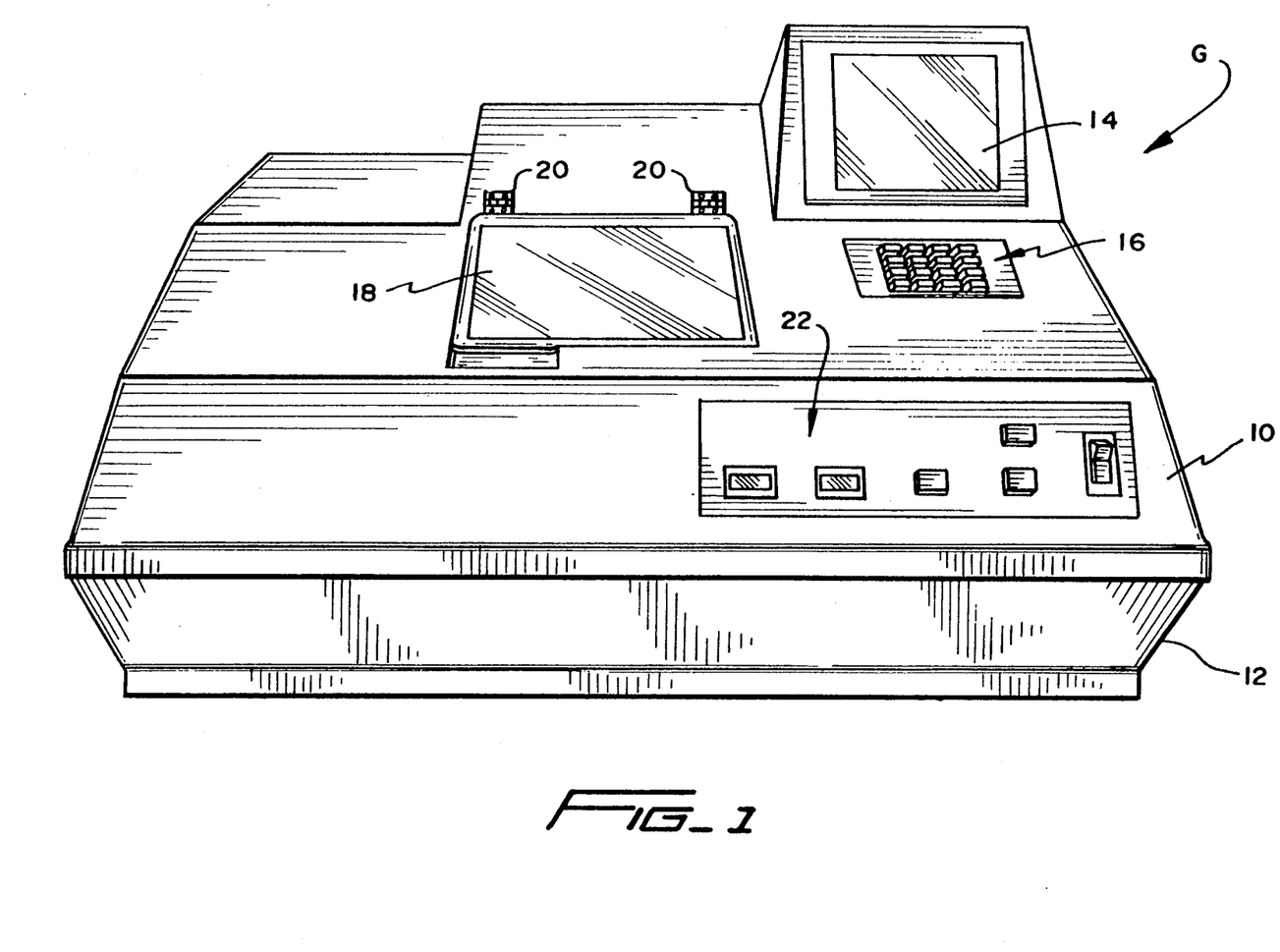
FIG. 1 is a front elevational view of the lens generator of the invention.

Lens generator G, as best shown in FIG. 1, comprises upper housing member 10 and pivotally connected lower housing member 12 which together define a housing. Upper member 10 has an optical display 14, such as a conventional video monitor, for displaying information to the operator and for requesting the input of information through keypad 16. Requested information would include, for example, lens material, cutting speed, optical characteristics desired, and the like. The keypad 16 and display 14 are, preferably, operably connected with a microprocessor which performs the necessary calculations and generates the required information and control signals for assuring that the finished blank has the selected optical properties.

Upper member 10 furthermore has a pivotal transparent window 18 facilitating operator access to the interior of the housing defined by members 10 and 12. The operator may lift window 18 by means of hinges 20 in order to secure or remove a lens blank from generator G. Upper member 10 furthermore includes control panel 22 having appropriate switches, gauges, and like control assemblies for assuring operation of the generator G.

Figure 2:
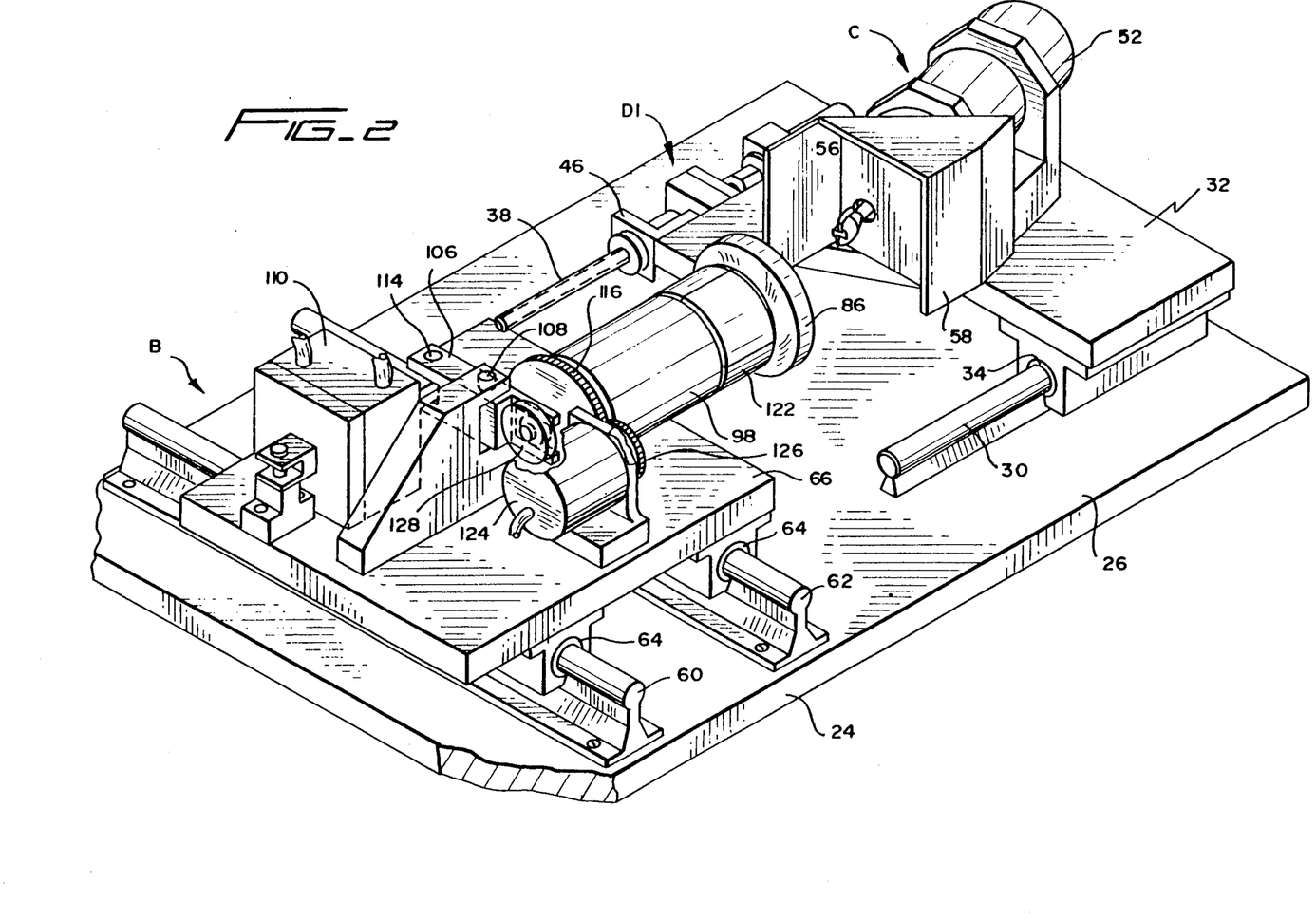
FIG. 2 is a top perspective view thereof with portions broken away for clarity.

Secured to lower member 12 is metal base plate 24 having upper surface 26, as best shown in FIG. 2. Base plate 24 is relatively heavy as compared to the plastic members 10 and 12 in order to provide stable anchorage for the operating components of the generator G, as well as for minimizing vibrations caused by the cutting operation. The base plate 24 is relatively small in size in order to be accommodated on a table top or similar relatively small support surface. The generator G therefore occupies minimal space, as compared to conventional generators.

Figure 3:
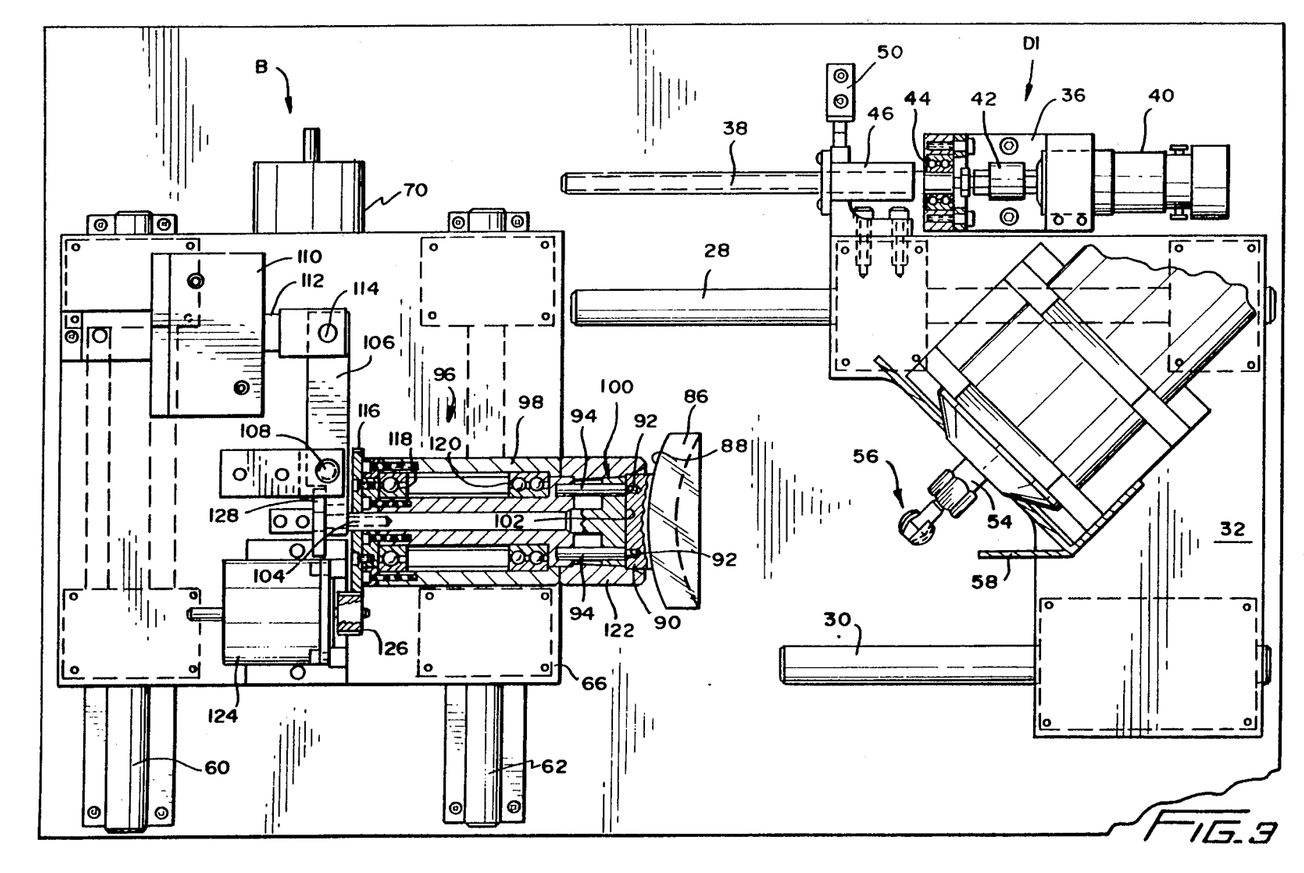
FIG. 3 is a fragmentary top plan view of FIG. 2.
Figures 4, 5:
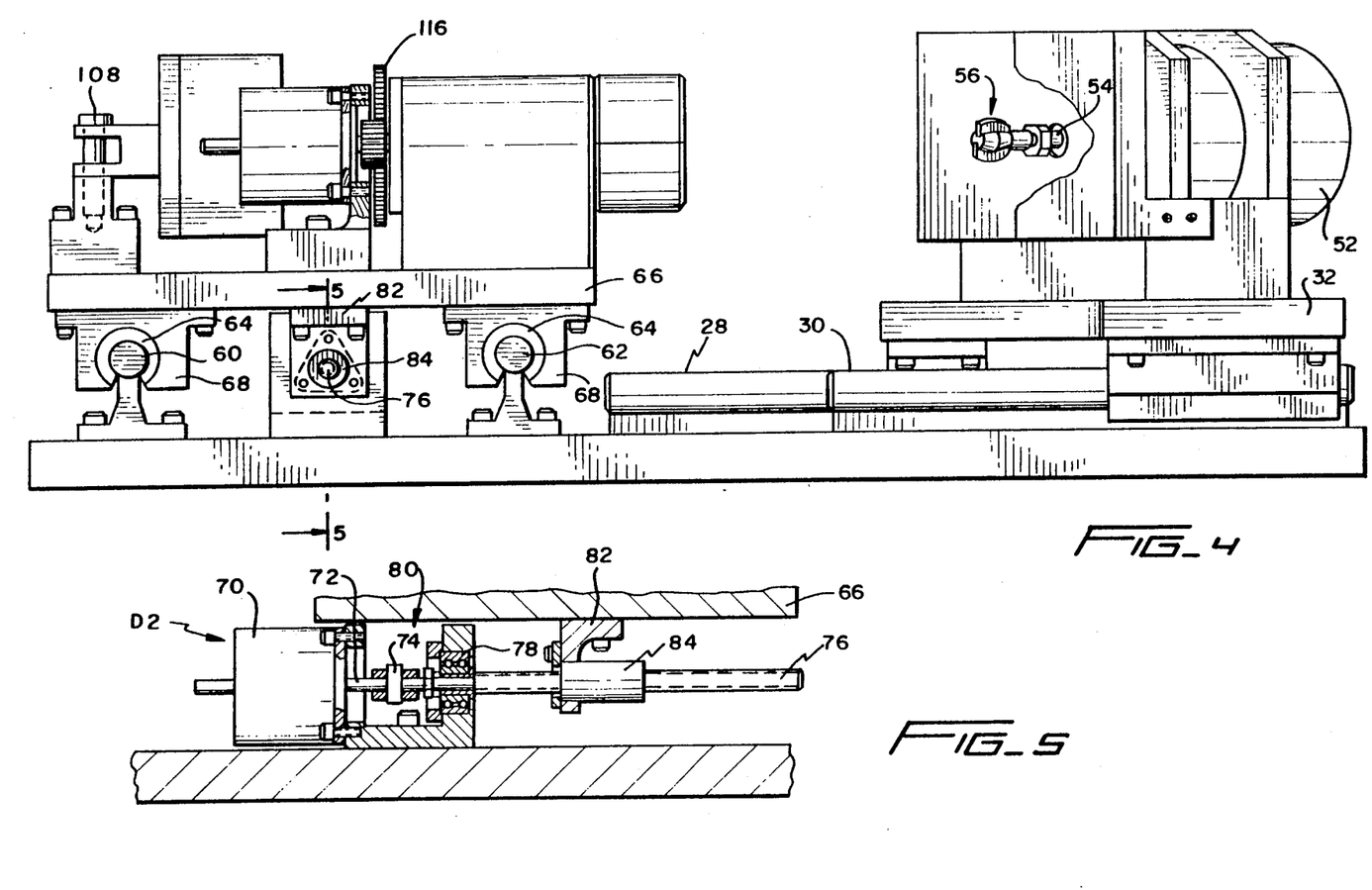
FIG. 4 is a front elevational view with portions broken away.
FIG. 5 is a fragmentary cross-sectional view taken along the line 5—5 of FIG. 4 and viewed in the direction of the arrows.

Lens generator G, as best shown in FIGS. 2, 3 and 4, include a cutter system C movable on surface 26 along a first axis, and a blank holding and rotating system B movable on surface 26 along a second axis transverse to the axis of movement of cutter system C. Since the systems B and C move only along two transverse axes, then their movement may be more accurately controlled so that the resulting blank has the desired shape. The cooperation of the systems B and C, and the rotating lens system, results in a three-axis cutting pattern with the ability to define any shape or surface desired.

Cutting system C, as best shown in FIGS. 2, 3 and 4 includes spaced metallic ways 28 and 30 secured in parallel array to plate 24. The way 28, as best shown in FIGS. 3 and 4, extends further along the surface 26 than does the way 30. Slidably mounted to the ways 28 and 30 is support or platform 32. Support 32 has a bearing assembly 34 operably associated with each of the way 28 and 30 in order to assure smooth movement therealong. In this way, the support 32 ca be easily moved along the ways 28 and 30 in order to approach or be retracted from the blank holding system B.

Drive system D1, as best shown in FIGS. 2 and 3, comprises a coupling assembly 36 secured to rotatable screw 38. Attached to the coupling assembly 36 is DC servo motor 40 which is operably connected to the screw 38 by coupling 42. Bearings 44 are mounted within coupling assembly 36 in order to assure free rotation of the screw 38 by the motor 40. Ball or nut 46 is threadedly engaged with screw 38, and is secured to support 32 by bolts 48. In this way, rotation of the shaft of motor 40 is imparted to the screw 38 for causing the ball 46 to be selectively moved therealong so that cooperating movement of the support 32 is achieved. We prefer the use of a servo motor 40, since it permits essentially infinite control, rapid operation and has automatic feedback for mechanical motion. Switch 50, as best shown in FIG. 3, is also mounted to plate 24 adjacent drive system D1 and is operably associated therewith in order to provide a reference point for the ball 46 upon the table relative to the lens blank position for assuring accurate cutter position.

High speed electric cutter motor 52, which preferably is a router motor, is secured to support 32 and has a shaft 54 extending at an angle of 45° relative to the axis of movement defined by the ways 28 and 30. High speed cutter head 56 is mounted to shaft 54 and is rotatable therewith and is movable with support 32 in response to rotation of the motor 40. Shroud 58 surrounds the cutter head 56 and is operably associated with a vacuum system (not shown) in order to minimize the accumulation of dust and shavings within the interior of members 10 and 12. The motor 52 rotates the shaft 54 and thereby the cutter head 56 at a speed of 20,000 rpm or more in order to assure good cutting, rapid removal of plastic material, and minimized affects of heat generation. Also, as will be further explained, the spherical shape, size and design of the cutter head 56 are such that the point of engagement with a lens blank during the shaping of curves is a consistent maximum linear tangential point contact for assuring accurate curves.

Ways 60 and 62 of blank system B are secured in parallel array to base plate 24, as best shown in FIGS. 2, 3 and 4, and extend generally transverse to ways 28 and 30. Bearings 64 surround each of the ways 60 and 62 and are operably associated with support or platform 66 disposed, as is support 32, parallel to plate 24. The bearings 64 assure smooth movement of the support 66 along the ways 60 and 62. A pillow block 68 surrounds each of the bearings 64, and is secured to the support 66 by bolts or the like.

Drive system D2, as best shown in FIGS. 3–5, is used for moving the support 66 along the ways 60 and 62. The drive system D2 is similar to the drive system D1. Drive system D2 includes a DC servo motor 70 having a high speed rotating shaft 72 connected by coupling 74 to threaded shaft 76. As with drive system D1, bearings 78 are secured to coupling assembly 80 for assuring free rotation of the screw 76. Arm 82 is secured to support 66 by bolts or the like, as best shown in FIG. 5. Sleeve or ball 84 is threaded about screw 76 so that rotation of the screw 76 by the motor 70 causes corresponding longitudinal displacement of the support 66. The shaft 76 and sleeve 84, as with the shaft 38 and sleeve 46 of the drive system D1, provide a ball screw system for assuring controlled movement of the associated supports 66 and 32, respectively, along the respective ways.

Plastic lens blank 86 has the outer surface 88 thereof secured to block 90 by a low temperature alloy blocking system known in the art, as best shown in FIG. 3. The block 90 has centering openings 92 which receive pins 94 of chuck 96. Chuck 96 includes an outer sleeve 98 in which longitudinally displaceable collet 100 is mounted. Collet 100 has a first end 102 cooperatively engaged with block 90 and through which the pins 94 extend. An outer sleeve 98 is secured to lever 106, as best shown in FIGS. 2 and 3. Internal spring pressure forces the outer sleeve towards the lens to close the collet. Pin 108 extends through lever 106 and permits the lever 106 to pivot thereabout. Pneumatic cylinder 110 having piston 112 is secured to support 66. Pin 114 secures the lever 106 to the piston 112, so that extension and retraction of the piston 112 causes cooperative pivoting of the lever 106 about the pin 108 and thereby associated movement of the collet sleeve 98 into and out of chuck 96. Extension of the piston 112 causes the collet body 122 to be drawn over the collet 100, so that the block 90 of the lens can be appropriately positioned for commencement of the cutting operation. Release of the piston 112, on the other hand, causes the collet 100 to close on the block 90 to secure the lens blank. The release of the piston also allows the rotation of the collet assembly around bearings 118 and 120.

Gear 116 is mounted to collet 100 at end 104, as best shown in FIG. 2. Bearings 118 and 120, as best shown in FIG. 3, are secured to collet 100 intermediate ends 104 and 102 in order to permit free rotation thereof within the chuck 96. Secondary sleeve 122 is rotatable with collet 100 for imparting controlled rotary motion to blank 86. Motor 124 is mounted to support 66 and has a toothed gear 126 meshingly engaged with the gear 116 for causing rotation thereof. In this way, rotation of the gear 126 causes rotary motion to be imparted to the blank 86 for permitting lens generation to occur. The speed of motor 124 is variable, as compared to the high speed motor 52 in order to assure controlled removal of the plastic composition, without damage to the surface finish.

Figure 6:
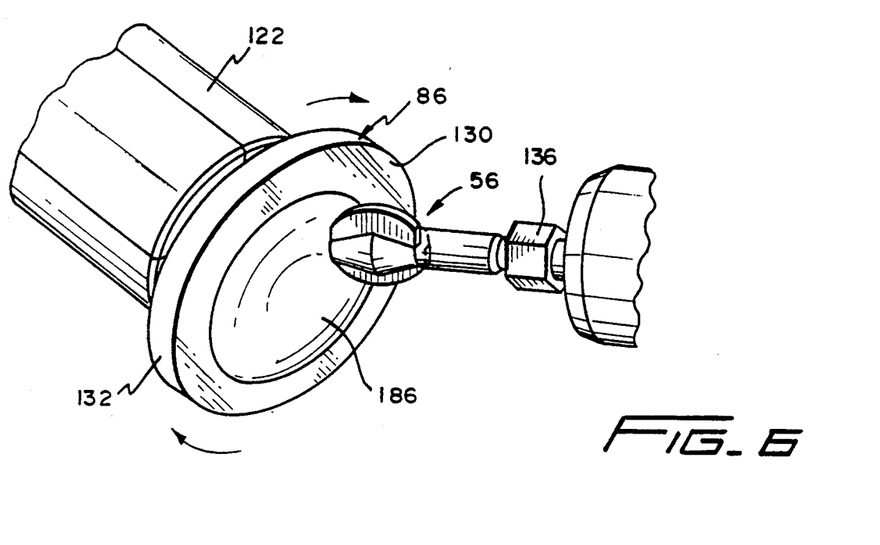
FIG. 6 is a fragmentary perspective view of the rotary cutter operating on a rotating lens blank.

FIG. 6 illustrates the cutter head 56 as it is operating upon the inner surface 130 of the blank 86. We prefer that the shaping of the blank 86 commence at the center axis of the rotating lens defined by the collet 100, and that the shaping move radially outwardly therefrom to edge 132. Those skilled in the art understand that the minimum thickness of the shaped lens at the axis point should be no less than 1.5 mm, although the thickness outwardly to the edge 132 may vary, depending on the optical prescription. We have found that commencing shaping at the axis reduces tortional stress on the lens as shaping continues, since the plunge into the material takes place at a point of zero torque. Should shaping commence at edge 132 and move inwardly towards the axis, then we have found that there is a greater tendency for distortion on account of the movement force applied by the cutter head 56 to the blank 86 from the rotation of the lens blank. This distortion is essentially eliminated, for reasons not fully understood, if shaping commences at the center axis, particularly under controlled material feed rates.

Figure 7:
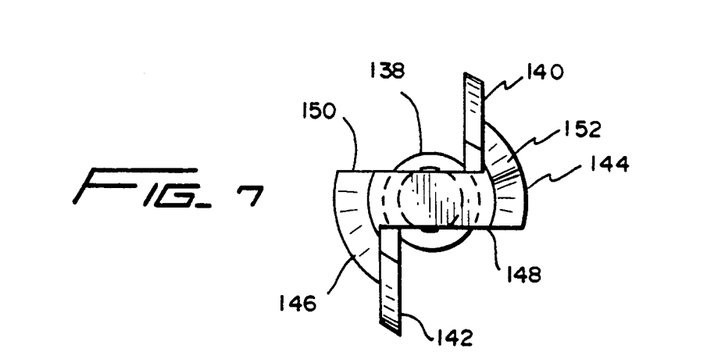
FIG. 7 is a front elevational view of the cutter of the invention.
Figure 8:
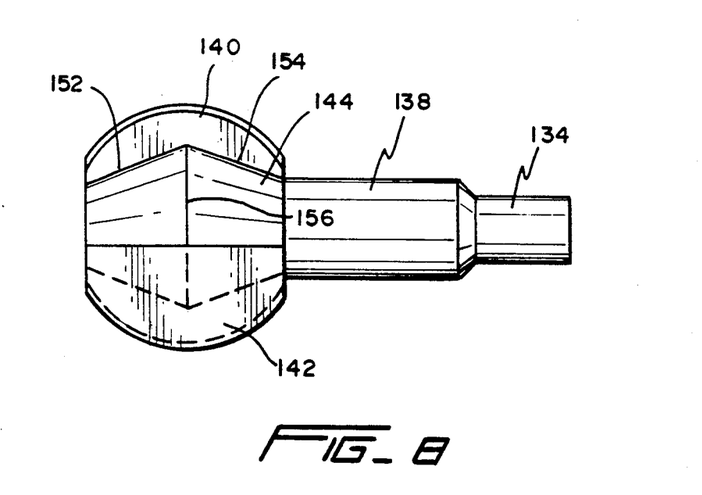
FIG. 8 is a side elevational view of the cutter of FIG. 7.

Cutter head 56 is best shown in FIGS. 7 and 8 and includes an end portion 134 securable within chuck 136 of shaft 54 Shaft 138 extends from end portion 134 and has a diameter in excess of the diameter of end portion 134. Cutting blades 140 and 142 extend in parallel but opposite directions from tapered support sections 144 and 146, respectively which are integral with shaft 138. It can be noted in FIGS. 7 and 8 that the tapered portions 144 and 146 terminate at ends 148 and 150, respectively. The tapered portions 144 and 146 provide support for the cutting blades 140 and 142 as they engage the blank 86 during the cutting operation and minimize the tendency of the blades 140 and 142 to become bent by the applied cutting pressure. Furthermore, the tapered sections, such as the sections 152 and 154 of the portion 144, as best shown in FIG. 8, essentially follow the arcuate contour of the blades 140 and 142 in order to provide substantially uniform support therealong.

The geometry of the blades provide a spherical cutting path, which allows the cutter to be easily compensated for the various curves. The diameter is 1.0 inches, which allows for the cutting of all prescription curves and sufficient tip speed across the length of the cutting edge of the blades to provide adequate stock removal.

We have found that maximum cutting efficiency occurs when the point of contact of the blades 140 and 142 is at that point which is furthest from the axis of rotation of the shaft 138. This is because the linear speed is greatest at that point, and thereby more material is removed per unit time. Furthermore, since the linear speed is greatest at that point, which corresponds with the ridge 156 of FIG. 8, then heat distortion is reduced since the blade is in contact with the blank 86 for a minimal amount of time per cut. Also, since the blades 140 and 142 are continuously arcuate along their longitudinal length, we can accommodate complicated geometries which require engagement of the blank 86 with some other portion of the blades 140 and 142. We have found that having the shaft 138 at an angle of 45° relate to the axis of rotation of blank 86 assures adequate cutting pressure, permits the blades 140 and 142 to be continuously arcuate, and assures proper contact for maximum cutting efficiency across the entire edge of the blades.

Figure 9:
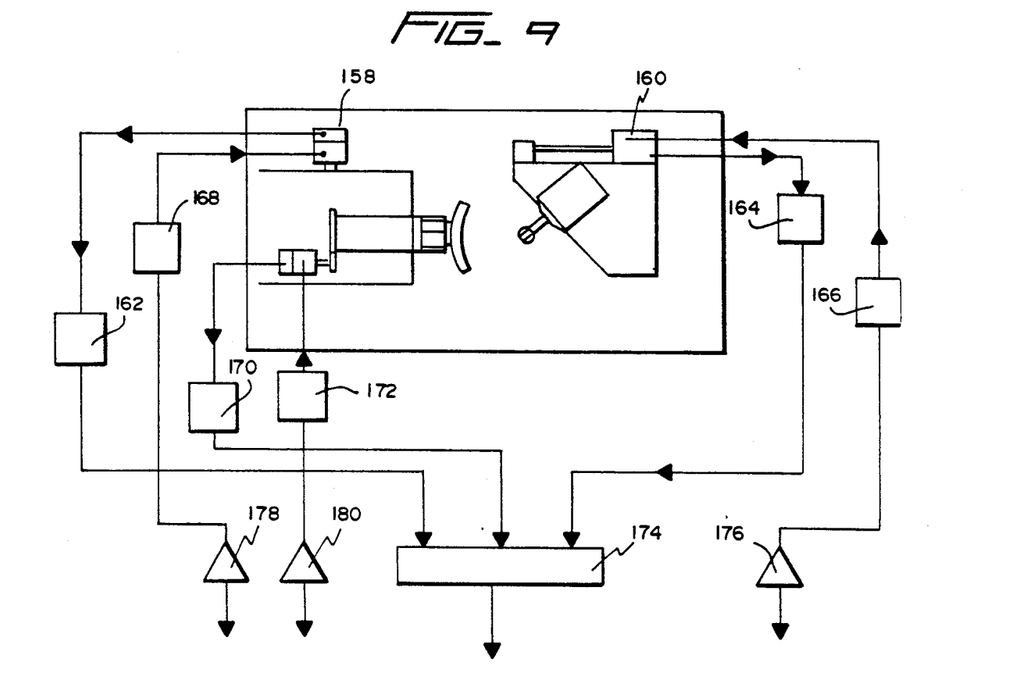
FIG. 9 is a schematic diagram illustrating the servo and drive controls of the invention; and, FIG. 10 is a schematic view of the control system of the invention.

FIG. 9 discloses the control feedback loops used for moving the supports 32 and 66 as the desired lens is generated. Movement of the supports or platforms 32 and 66 can be equated to defining X, Y and $\theta$ coordinates on the blank 86. These coordinates are calculated by the microprocessor on a real time basis, and thereby the need for converting inputted prescription information into machine control data is avoided. The control data is generated as the machine operates, thereby increasing efficiency.

The rotary encoder 158 in combination with the position switch 50 of FIG. 3 is used for the real-time feedback loop to determine the exact position of the support 66 at any time during the cutting cycle. The rotary encoder 160, in combination with the home switch 50, likewise is used in the feedback loop to determine the exact position of support 32 at any time during the cutting cycle. Switches 158 and 160 feed feedback controllers 162 and 164, respectively, and thereby provide reference Y and X points, respectively. At the same time, or preferably even earlier, the diameter of the cutting head 56 and the feed rate are inputted, as is the lens blank size and desired center thickness to assure that the cutter travels an adequate distance to reach the blank 86.

The DC servo motors 40 and 70 move the associated screws 38 and 76, respectively, in response to control signals transmitted thereto by control drivers 166 and 168, respectively. Servo motor 124 sends a control signal to feedback controller 170 so that the angular orientation of the blank 86 is known at any point in time. The motor 124 is driven in response to a signal output by driver 172. Each of the feedback controllers 162, 164 and 170 feeds an interface 174 which communicates with the microprocessor.

Figure 10:
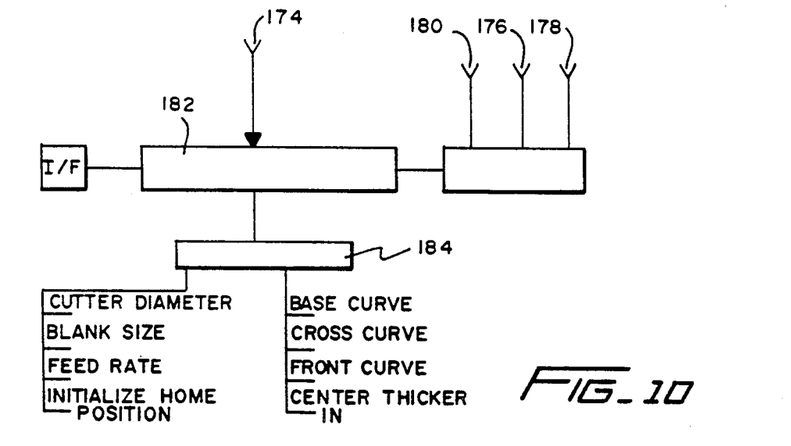

The interface 174 permits computer control of the various motors of the generator G, and thereby assures that the blank 86 achieves the desired shape. Each of the controllers 166, 168 and 172 is part of a control circuit 176, 178, and 180, respectively, which communicates with the microprocessor 182, as best shown in FIG. 10. The microprocessor 182 has an interface 184 with the key pad 16 for permitting necessary information to be input so that the desired cutting will be achieved.

Operation of the generator G is facilitated by the microprocessor 182, since the display 14 and key pad 16 permit the operator to enter readily the data required to generate the finished lens. The required data includes base curve, cross curve, front curve, center thickness, and a specified prismatic value, if required. The software of processor 182 in the generator G calculates the formula for the surface points that will define the back surface of the resulting lens and the path of cutter head 52 required to cut the surface in a spiral path (center to edge) as the blank 86 rotates.

When the start button is depressed, then the cutter motor support 32 moves towards the rotating lens blank 86 at the center point of the block 90. The blank 86 is rotated relatively slowly by the high tolerance gear assembly 116 and the geared DC servo motor 124. The encoder 170 determines the exact radial orientation of the blank 86 during cutting. The rotating cutter head 56 plunges into the lens blank 86 to the prescribed center thickness by operation of drive system D1. The cutter 56 moves from the center of the blank 86 to the edge 132 in response to forward movement of the lens drive system D2. The cutting pattern that results is a spiral from the center out to the edge 132. The movement of the cutter motor support 32 along the axis defined by the ways 28 and 30 will describe the cylinder grinds.

With a 1.0 inch diameter spherical cutting path, we have found that we can achieve an acceptable finish with a 0.050 inches per separation between adjacent spirals. Through the computer control this spiral separation distance can be changed to less than 0.050 to minimize subsequent polishing operations. Because of the infinite control of servo motor 70 which moves the blank 86 relative to the cutter head 56, the spiral separation distance, and thus the height of the ridges, may be selected by the operator as a function of how much time is to be expended on the subsequent polishing operations. This versatility is a unique feature of the invention.

One of the advantages of the design of the cutter head 56 is the minimization of the stock removal requirements during the subsequent polishing or fining process. Those skilled in the art will understand that decreasing the distance between the spirals results in a surface finish which is relatively more smooth, thus reducing or possibly even eliminating fining time. For example, with the 1.0 inch diameter spherical cutter, the change in spiral separation from 0.050 distance to a 0.010 distance, will reduce the height of the edges from 0.00031 to 0.00001. Because of the microprocessor 182 and the accuracy of position of our cutter 56, the surface 186 generated on the blank 86 will have no elliptical error, thus eliminating a major problem with conventional lens generator. Our small cutter head 56 permits the generator G to cut the full range of prescription curves, up to 20 diopters, without requiring that the cutter 56 be changed. Furthermore, prism, the shifting of the optical center for a stigmastism or maximizing lens blank usage, which with traditional generators is now either blocked in or effected with prism rings, can be programmed through the mapping of the back surface 88 by the processor 182.

While this invention has been described as having a preferred design it is understood that it is capable of further modifications, uses and/or adaptations of the invention following in general the principle of the invention and including such departures from the present disclosure as come within known or customary practice in the art to which the invention pertains and as may be applied to the central features hereinbefore set forth, and fall within the scope of the invention of the limits of the appended claims.

What we claim is:

1. A generator for plastic lenses, comprising:
 a) first and second spaced parallel guides extending in a first direction;
 b) a first support displaceably mounted to said first and second guides for movement therealong;
 c) first servo drive means operably associated with said first support for selectively moving said first support along said first and second guides;
 d) rotatable chuck means mounted to said first support and moveable therewith for grasping a lens blank and causing rotation thereof, said chuck means rotatable on a first axis transverse to said first and second guides;
 e) variable speed drive means operably associated with said chuck means and moveable therewith for selectively rotating said chuck means about said first axis;
 f) third and fourth spaced parallel guides extending in a second direction transverse to said first direction;
 g) a second support displaceably mounted to said third and fourth guides for movement therealong;
 h) second servo drive means operably associated with said second support and disposed exteriorly of said third and fourth guides and extending therealong and parallel thereto for selectively moving said second support along said third and fourth guides;
 i) rotatable cutter means mounted to said second support between and above said third and fourth guides and movable with said second support, said cutter means rotatable on a second axis extending angularly relative to said second direction and said cutter means selectively engageable with the lens blank for generating a surface thereon; and
 j) constant speed drive means mounted to said second support and moveable therewith and operably associated with said cutter means for causing rotation thereof.

2. The generator of claim 1, wherein:
 a) first gear means are secured to said variable speed drive means and rotatable therewith; and
 b) second gear means are secured to said chuck means for causing said rotation thereof, said first and second gear means being meshingly engaged so that rotation of said variable speed drive means causes corresponding rotation of said chuck means and thereby of the blank.

3. The generator of claim 2, wherein:
 a) said second gear means has a diameter in excess of the diameter of said first gear means so that said chuck means is rotated relatively slowly by said variable speed drive means.

4. The generator of claim 3, wherein:
 a) said variable speed drive means is a servo motor.

5. The generator of claim 1, wherein:
 a) pneumatic actuator means are operably associated with said chuck means for causing opening of said chuck means; and b) spring means are operably associated with said chuck means for causing closing of said chuck means.

6. The generator of claim 5, wherein:
a) said pneumatic actuator means includes a piston operably associated with chuck means for causing operation thereof and said piston extending parallel to said first axis.

7. The generator of claim 6, wherein:
a) said pneumatic actuator means is mounted to said first support and movable therewith.

8. The generator of claim 6, wherein:
a) said variable speed drive means includes a rotatable shaft extending parallel to said first axis.

9. The generator of claim 8, wherein:
a) first gear means are secured to said rotatable shaft and rotatable therewith; and
b) second gear means are operably associated with said chuck means for causing rotation thereof, said first and second gear means being meshingly engaged so that operation of said variable speed drive means causes rotation of said shaft and thereby rotation of said chuck means.

10. The generator of claim 9, wherein:
a) said variable speed drive means is a servo motor.

11. The generator of claim 10, wherein:
a) said second gear means has a diameter exceeding the diameter of said first gear means so that said chuck means is rotated relatively slowly by said servo motor.

12. The generator of claim 1, wherein:
a) an arm is secured to said second support and extends outwardly therefrom; and
b) said second servo drive means is engaged with said arm so that operation of said second servo drive means causes associated movement of said second support.

13. The generator of claim 12, wherein said second servo drive means includes:
a) a threaded ball secured to said arm;
b) a rotatable shaft threadedly engaged with said ball so that rotation thereof causes corresponding movement of said second support; and
c) a servo motor drivingly engaged with said shaft for imparting rotation thereto.

14. The generator of claim 13, wherein:
a) switch means are operably associated with said ball for assuring accurate positioning of said cutter means during movement of said second support.

15. The generator of claim 13, wherein:
a) said second servo drive means extends substantially the length of said third guide means; and
b) said fourth guide means has a length less than the length of said third guide means.

16. The generator of claim 15, wherein:
a) said second support has first and second transversely extending legs, each of said legs mounted to one of said third and fourth guides; and
b) said cutter means extends angularly between and beyond said legs for facilitating engagement with the lens blank.

17. The generator of claim 16, wherein:
a) a shroud is secured to said second support and surrounds said cutter means for minimizing the accumulation of cuttings from the lens blank.

18. The generator of claim 1, wherein:
a) a shroud is secured to said second support and surrounds said cutter means.

19. The generator of claim 1, wherein:
a) said first support lies upon a first plane and said second support lies upon a second plane spaced below said first plane.

20. The generator of claim 19, wherein:
a) each of said first and second servo drive means is disposed below the associated support.

21. A generator for plastic lenses and the like, comprising:
a) first and second pairs of ways, said first pair of ways extending in a first direction and said second pair of ways extending generally transverse thereto and the ways of each pair being spaced apart and disposed in parallel;
b) first and second supports, each support displaceably mounted to the ways of one of said pairs of ways and moveable therealong;
c) a rotatable collet assembly mounted to said first support and moveable therewith, said collet assembly adapted for grasping a lens blank and rotating same;
d) a first toothed gear connected to said collet assembly;
e) first variable speed drive means mounted to said first support adjacent said first gear, said first variable speed drive means including a rotatable shaft;
f) a second toothed gear connected to said shaft and rotatable therewith, said second toothed gear meshingly engaged with said first toothed gear so that rotation of said shaft causes associated rotation of said first gear and thereby of the collet assembly and the blank;
g) a cutter system secured to said second support and moveable therewith for selectively engaging a lens blank grasped by said collet assembly and for generating a surface thereon;
h) first and second servo drives, each of said servo drives connected to one of said supports for controlling movement thereof along the associated ways; and
i) said second servo drive is disposed adjacent to and exteriorly of one of the ways of said second pair of ways.

22. The generator of claim 21, wherein:
a) said first toothed gear has a diameter in excess of the diameter of said second toothed gear so that operation of said first variable speed drive means causes relatively slow rotation of said chuck assembly and thereby of the blank.

23. The generator of claim 22, wherein:
a) said collet assembly includes a linearly extending actuator disposed parallel to the axis of rotation of said collet assembly.

24. The generator of claim 23, wherein said actuator includes:
a) a pneumatically operated cylinder and piston assembly having an extensible piston.

25. The generator of claim 24, wherein:
a) biasing means are operably associated with said collet assembly for causing said collet assembly to grasp the lens blank.

26. The generator of claim 21, wherein said second servo drive includes:
a) a threaded nut secured to said second support;
b) a threaded shaft engaged with said nut; and
c) a servo motor secured to said threaded shaft for causing rotation thereof so that rotation of said threaded shaft causes associated movement of said second support.

27. The generator of claim 26, wherein:
a) said second servo drive extends substantially the length of said one way, and the other way of said second pair of ways has a length less than said one way.

28. The generator of claim 27, wherein:
a) said second support is L-shaped and has two perpendicularly disposed legs, each of said legs mounted to one of the ways of said second pair of ways; and
b) said threaded nut is secured to the leg mounted to said one way.

29. The generator of claim 27, wherein:
a) said cutter system extends angularly from between said legs toward said other way.

30. The generator of claim 29, wherein:
a) said cutter system includes a rotatable cutter head; and
b) a shroud is secured to said second support and surrounds said cutter head.

* * * * *